(12) United States Patent
Murakami et al.

(10) Patent No.: US 6,957,814 B2
(45) Date of Patent: Oct. 25, 2005

(54) METAL GASKET

(75) Inventors: Yasunori Murakami, Wako (JP); Jun Iwamoto, Wako (JP); Takeshi Hagiwara, Wako (JP); Osamu Tosa, Saitama (JP); Atsushi Matsufuji, Saitama (JP)

(73) Assignees: Honda Giken Kogyo Kabushiki Kaisha, Tokyo (JP); Nippon Leakless Industry Co., Ltd., Tokyo (JP)

( * ) Notice: Subject to any disclaimer, the term of this patent is extended or adjusted under 35 U.S.C. 154(b) by 0 days.

(21) Appl. No.: 10/173,096

(22) Filed: Jun. 18, 2002

(65) Prior Publication Data
US 2003/0011140 A1 Jan. 16, 2003

(30) Foreign Application Priority Data
Jun. 19, 2001 (JP) ........................ 2001-184892

(51) Int. Cl.[7] .............................................. F02F 11/00
(52) U.S. Cl. ........................ 277/592; 277/594; 277/598
(58) Field of Search ................................ 277/590–595, 277/589, 598

(56) References Cited

U.S. PATENT DOCUMENTS

| | | | | |
|---|---|---|---|---|
| 3,930,656 A | * | 1/1976 | Jelinek | 277/611 |
| 4,203,608 A | * | 5/1980 | Nicholson | 277/595 |
| 4,688,809 A | * | 8/1987 | Deppe | 277/594 |
| 4,796,897 A | * | 1/1989 | Inciong | 277/594 |
| 5,078,413 A | * | 1/1992 | Miyaoh | 277/595 |
| 5,221,097 A | * | 6/1993 | Ishikawa et al. | 277/594 |
| 5,695,203 A | * | 12/1997 | Udagawa | 277/595 |
| 5,700,015 A | * | 12/1997 | Tensor | 277/591 |
| 5,711,537 A | * | 1/1998 | Inamura et al. | 277/595 |
| 5,988,651 A | * | 11/1999 | Miyaoh | 277/593 |
| 6,422,573 B1 | * | 7/2002 | Sekioka | 277/594 |
| 6,457,724 B2 | * | 10/2002 | Ogaeri et al. | 277/595 |
| 6,457,726 B1 | * | 10/2002 | Jung | 277/611 |

FOREIGN PATENT DOCUMENTS

| FR | 810 728 | 3/1937 |
|---|---|---|
| GB | 883 267 | 11/1961 |

* cited by examiner

Primary Examiner—Heather Schackelford
Assistant Examiner—Vishal Patel
(74) Attorney, Agent, or Firm—Young & Thompson

(57) ABSTRACT

Disclosed is a metal gasket which is capable of securing a sealing properties by strongly pressing a portion of a bead thereof, which faces a portion where a pressuring surface of one joining surface of one of an intake manifold and an EGR plate does not exist, to the other joining surface thereof. A metal gasket which is clamped between the two joining surfaces and has at least one hole for fluid, includes a bead for sealing the two joining surfaces, the bead surrounding the at least one hole for fluid, each of which allows openings for fluid to be communicated with each other, the openings being provided in the respective joining surfaces. The metal gasket further includes a convex portion, the tip of which abuts one of the joining surfaces, is provided in the vicinity of a portion of the beads abutting the other joining surface.

14 Claims, 5 Drawing Sheets

⟶  I, III : CYLINDER HEAD SIDE EGR GAS FLOW
--→  II : EGR PLATE SIDE EGR GAS FLOW

1

METAL GASKET

BACKGROUND OF THE INVENTION

The present invention relates to a metal gasket, which is clamped between two joining surfaces and seals the joining surfaces with a bead thereof, the metal gasket including the bead surrounding at least one hole for fluid, which allows openings for fluid to be communicated with each other, the openings being provided in the respective joining surfaces.

As a metal gasket mentioned above, for example as shown in FIG. 7, a metal gasket 3 which is held between two joining surfaces 1 and 2, which are joining surfaces with an engine cylinder head and with an EGR plate which is installed on an intake manifold and on which a gas passage concavity for EGR system is formed, is included. Such a metal gasket 3 usually has an intake through hole 3a connecting an intake port 1a and an intake pipe port 2a, which are provided, as openings for fluid, each on the joining surface 1 of the cylinder head and the joining surface 2 of EGR plate installed on the intake manifold, and a full bead 3b having a cross section of a chevron shape as a bead surrounding the intake through hole 3a (It looks V shape in the drawing). Whole circumference of the full bead 3b is interposed between the joining surfaces 1 and 2, which are urged in the closing direction each other by fitting bolts (not shown in the drawing) as shown by an arrow A in the drawing, and is pressed strongly by the joining surfaces 1 and 2. Thus, high surface pressure is generated on whole circumference of the full bead 3b to exert high sealing properties.

At the request for further engine exhaust gas cleaning and more improvement in fuel consumption and the like in recent years, there have been a possibility that as shown in FIG. 8, the foregoing gas passage concavity 2b, lightning holes and lightning hollows for weight reduction (not shown in the drawing) are formed in an opposite position to a part of bead 3b on a joining surface 2 of an EGR plate installed on the an intake manifold, which is one of two joining surfaces 1 and 2 holding a metal gasket 3 therebetween. When portions without pressuring surface such as the gas passage concavity 2b, the lightning holes and the like are formed, in a single plate-type metal gasket 3 which has been used conventionally, the portions of bead 3b opposite to the portions without pressuring surface such as the foregoing gas passage concavity 2b, the lightning holes and the like should be originally pressurized to the other joining surface as shown with a dashed lined in the drawing. However, there is no surface to push the portions of bead 3b, and the areas of bead 3b can be escaped to an area without pressuring surface as shown with a solid line in the drawing. Therefore, there has been a problem that the areas of bead 3b are not pressurized strongly enough to the joining surface 1 of cylinder head which is the other joining surface and sealing properties in the areas of bead 3b decrease. It has been particularly a problem that the decrease of the sealing properties is especially remarkable when the metal gasket 3 is held between the foregoing joining surface 1 of a cylinder head and the joining surface 2 of EGR plate where pressure in the openings becomes negative pressure since the openings for fluid are an intake port 1a and an intake pipe port 2a.

Then, in order to secure sealing properties on whole circumference of the bead, a laminated metal gasket was studied, in which a gasket constitutional plate being adjacent to the other joining surface mentioned above, has a bead. The areas of the bead opposite to portions having no pressuring surface such as a gas passage concavity and a lightning hole and the like on one joining surface mentioned above, are pressurized by other gasket constitutional plate to the other joining surface. In this way, however, there has been a problem that sometimes the above described method could not satisfy the request for weight reduction and cost reduction sufficiently since weight of a metal gasket as a whole is increased and also manufacturing cost is increased.

SUMMARY OF THE INVENTION

An object of the present invention is to provide a metal gasket in which subjects mentioned above are solved advantageously. A metal gasket according to the present invention is designed to be clamped between two joining surfaces and has at least one hole for fluid. The metal gasket includes a bead for sealing the two joining surfaces, the bead surrounding the at least one hole for fluid, which allows openings for fluid to be communicated with each other, the openings being provided in the respective joining surfaces. The metal gasket further includes a convex portion, a tip of which abuts one of the joining surfaces, is provided in vicinity of a portion of the bead abutting only the other joining surfaces.

In such the metal gasket, since the portions having no pressuring surface such as a gas passage concavity, a lightning hole and the like exist on the other one of the foregoing two joining surfaces, the bead has an area where the bead abuts only one of the two joining surfaces, and the convex portion, the tip of which abuts the other one of the two joining surfaces, is formed near the area where the bead abuts only one of the foregoing two joining surfaces. Therefore, surrounding areas of the convex portion of the metal gasket is pushed toward one of the foregoing two joining surfaces by abutting of the tip of the convex portion to the other joining surface, and areas of the bead abutting only the foregoing one joining surface near to the convex portion of the metal gasket are pressurized strongly to the one joining surface. Thus, high surface pressure is generated also on areas of the bead where the bead abuts only the one joining surface.

Therefore, according to the metal gasket in the present invention, at the request for further engine exhaust gas cleaning and more improvement in fuel consumption, the portions having no pressuring surface such as a gas passage concavity for EGR gas system, a lightning hole for weight reduction and the like are formed on areas partly opposite to a bead, on one of the two joining surfaces holding the metal gasket therebetween, even if a single plate-type metal gasket is employed without a bother to employ a laminated metal gasket, high sealing properties by the foregoing high surface pressure can be obtained on areas of a bead opposite to the portions having no pressuring surface such as a gas passage concavity, a lightning hole and the like.

Note that, the metal gasket according to the present invention may be a laminated type in a case that higher sealing property is requested and the like. In such a case, since rigidity of the laminated metal gasket becomes bigger than that of a single plate-type one, bead areas abutting only one joining surface of the foregoing two joining surfaces, locating near to the convex portion of the metal gasket, are pressurized more strongly to the one joining surface by abutting of the tip of the convex portion to the other joining surface. Thus, high surface pressure is generated on areas of the bead where the bead abuts only one joining surface and higher sealing properties (pressure resistance) can be obtained.

Moreover, in the metal gasket according to the present invention, the foregoing convex portion may be provided in a position where the convex portion abuts only the foregoing other one of the foregoing two joining surfaces, that is, a position where the convex portion does not abut the foregoing one joining surface. In this way, since the convex portion, the tip of which abuts the foregoing other joining surface, is pushed toward the foregoing one joining surface without being restricted by the one joining surface, bead areas locating near to the convex portion are pressurized more strongly to the foregoing one joining surface to generate higher surface pressure, and higher sealing properties (pressure resistance) can be obtained.

Further, in the metal gasket according to the present invention, the foregoing bead may be a full bead, and the area abutted only one of the foregoing two joining surfaces may be a tip of the full bead. In this way, bead areas abutted only one joining surface mentioned above are the tip of the full bead, and since the tip of the full bead is pushed strongly to one joining surface mentioned above by abutting of the tip of the convex portion to the other joining surface mentioned above, higher surface pressure is generated on the areas of the bead where the bead abuts only one joining surface, and higher sealing properties (pressure resistance) can be obtained.

Further, in the metal gasket according to the present invention, at least tip portion of the foregoing convex portion may be formed to be a hemispherical shape, and a rubber coating layer composed of synthetic rubber, or the like, may be formed on both sides of a blank metal plate composing the foregoing metal gasket except at least an area of the tip portion of the foregoing convex portion and an area forming a fluid passage. In this way, since the tip portion near the tip of the convex portion which is abutted on a joining surface, has at least a hemispherical shape, even if there is some dispersion in flatness of joining surfaces within tolerance, beads can be pressurized uniformly. Moreover, since the rubber coating layer formed on both sides of the blank metal plate composing the metal gasket can be deformed elastically corresponding to tool marks and the like on the joining surfaces, higher sealing properties can be obtained. Moreover since the rubber coating layer is formed on the area except at least areas of the tip of the convex portion and fluid passages, wearing of the rubber coating layer by fretting (sliding) generated from repeated temperature variation of an engine can be avoided and at the same time transmission efficiency of pressuring force can be improved. On the other hand, separation of the rubber-coating layer by flowing of fluid in the fluid passage areas can be prevented.

DETAILED DESCRIPTION OF THE PREFFERED EMBODIMENTS

Figure 3:
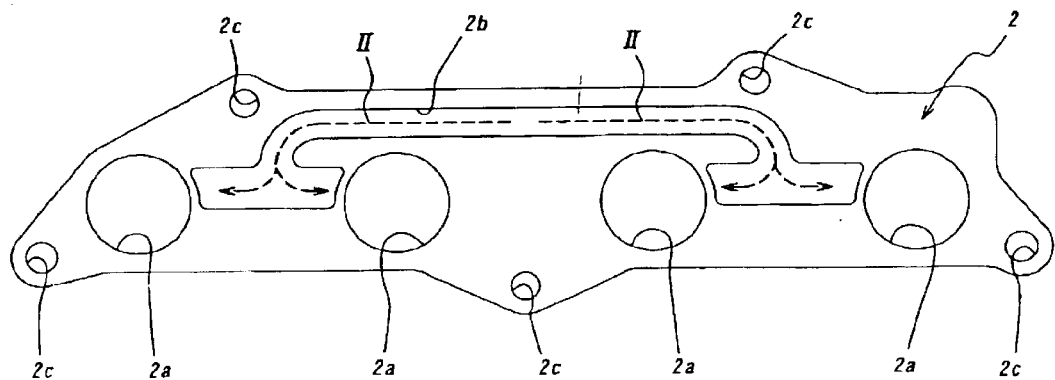
FIG. 3 is a plan view showing a joining surface of EGR plate to the cylinder head, the EGR plate being installed on the intake manifold, which is the other joining surface of the two joining surfaces to clamp the metal gasket of the foregoing embodiment therebetween.
Figure 1:
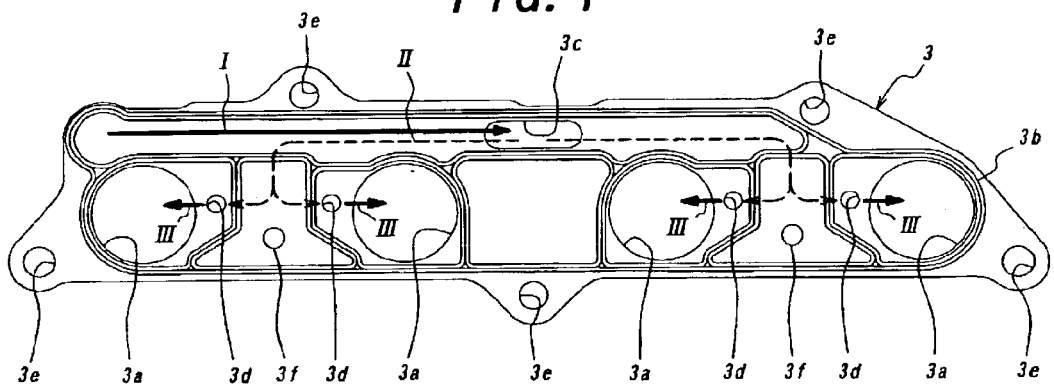
FIG. 1 is a plan view showing a single plate-type metal gasket as one embodiment of a metal gasket according to the present invention.
Figure 2:
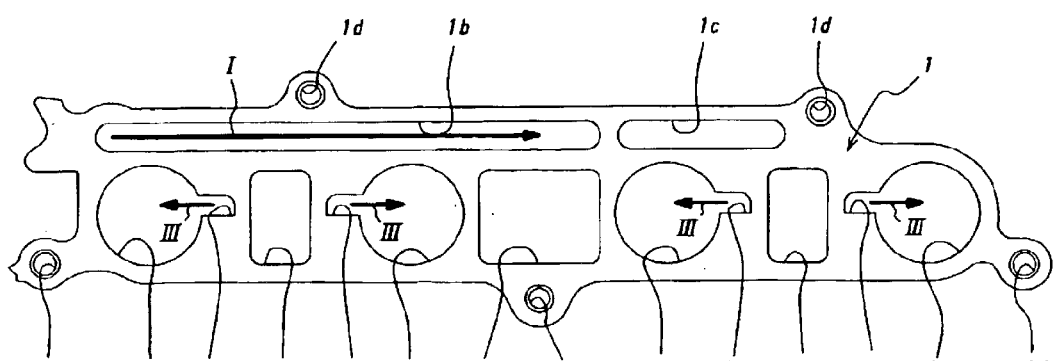
FIG. 2 is a plan view showing a joining surface for installing an intake manifold, of a cylinder head of an automotive engine, which is one of the two joining surfaces to clamp the metal gasket of the foregoing embodiment therebetween.

Hereafter, description will be made in detail for a preferred embodiment of the present invention with reference to the drawings. Here, FIG. 1 is a plan view showing a single plate-type metal gasket as the embodiment of metal gaskets according to the present invention. FIG. 2 is a plan view showing a joining surface for installing an intake manifold of a cylinder head for an automotive engine, which is one of the two joining surfaces clamping the metal gasket of the embodiment therebetween. FIG. 3 is a plan view showing a joining surface of an EGR plate to the cylinder head, the EGR plate is installed on the intake manifold, which is the other one of the two joining surfaces clamping the metal gasket of the embodiment mentioned above therebetween.

On a joining surface 1 for installing an intake manifold, of a cylinder head for an automotive engine shown in FIG. 2, four intake ports 1a as an opening for fluid are provided, and also a gas passage concavity (concave portion) 1b for an EGR system, as an area without pressuring surface, extending in a channel shape from left side to center area on the upper area of the joining surface 1 in the figure. There are also provided lighting concavities (concave portions) 1c for weight reduction, as portions having no pressuring surface, which are located on the upper area of the joining surface 1 and areas between adjacent intake ports 1a in the figure, and five bolt installing holes 1d for installing the foregoing EGR plate to the cylinder head on a joining surface 1 for installing the intake manifold. In each intake port 1a, extending portion 1e, which extends toward another intake port 1a adjacent to the former intake port 1a, is provided.

Furthermore, on a joining surface 2 of the EGR plate installed on the intake manifold shown in FIG. 3, four intake pipe ports 2a as openings for fluid are provided. There is also provided a gas passage concavity 2b for an EGR system as an area without pressuring surface, which is extended left and right side in a channel shape on the upper area of the joining surface 2 with both ends thereof extending downward, and is located between adjacent intake pipe ports 2a which is two pairs each on either side in the figure, and five penetrating holes 2c for fitting bolts for installing the EGR plate to a cylinder head, on the joining surface 2.

Figure 4:
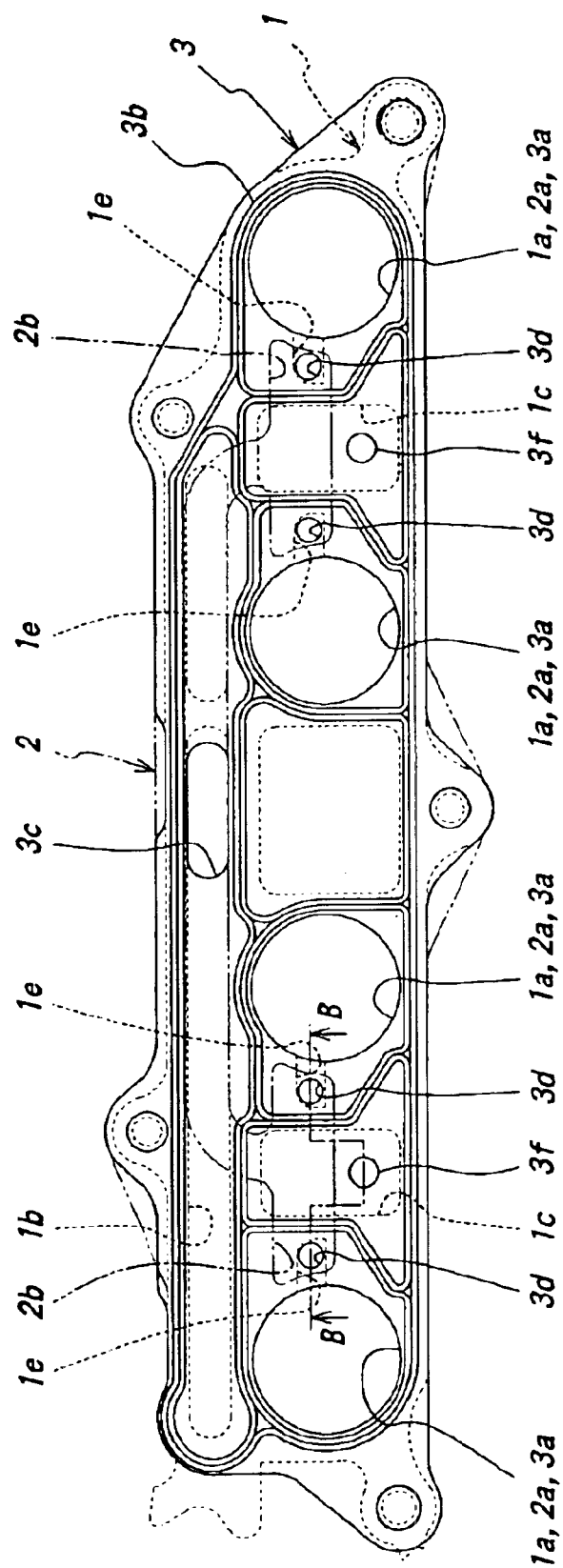
FIG. 4 is a descriptive view showing a state that the foregoing metal gasket is held between the foregoing two joining surfaces.

The metal gasket 3 according to the present invention shown in FIG. 1, is made of a blank metal plate of stainless steel, for example, and the metal gasket 3 has four intake through holes 3a connecting the foregoing four intake ports 1a provided on the joining surface 1 of the cylinder head with the foregoing four intake pipe ports 2a provided on the joining surface 2 of the EGR plate, and a continuous full bead 3b having a cross section of a chevron shape as a bead surrounding those intake through holes 3a so as to separate each of the intake through holes 3a, as shown in a state where the metal gasket 3 is held between the joining surfaces 1 and 2 in FIG. 4. The metal gasket 3 also has a gas passage through hole 3c connecting the gas passage concavity 1b provided on the joining surface 1 of the cylinder head with the center portion of the foregoing gas passage concavity 2b provided on the joining surface 2 of the EGR plate each other, four gas passage through holes 3d connecting both ends of the foregoing gas passage concavity 2b provided on the joining surface 2 of the EGR plate with extended portions 1e of the foregoing each intake port 1a in the joining surface 1 of the cylinder head, and five penetrating holes 3e for fitting bolts, which are located corresponding to the five bolt installing holes 1d for installing the foregoing EGR plate and the penetrating holes 2c for fitting bolts.

Hereupon, the foregoing full bead 3b surrounds together the intake through holes 3a corresponding to each intake port 1a and the gas passage through holes 3d corresponding to extended portions 1e of the intake ports 1a to seal the intake through holes 3a and gas passage through holes 3d to the lighting concavities 1c locating between adjacent intake ports 1a, each of two pairs on either sides. In addition, the full bead 3b surrounds the gas passage through holes 3c as surrounding the gas passage concavity 1b on the joining surface 1.

Figure 5:
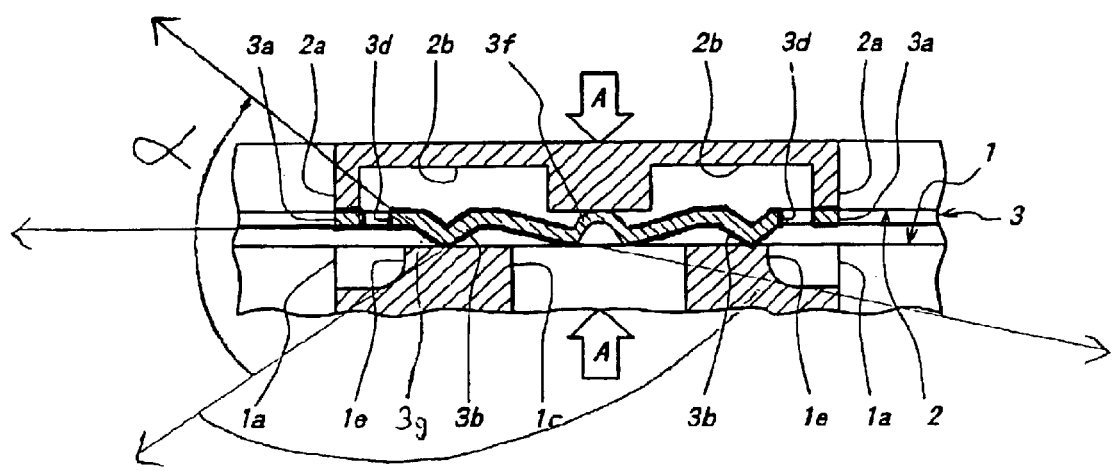
FIG. 5 is a sectional view taken along a B—B line in FIG. 4.

Further, the metal gasket 3 in the embodiment is shown in FIG. 4 in a state that it is clamped between the foregoing joining surfaces 1 and 2, and as shown in sectional view of FIG. 5 taken along a B—B line in FIG. 4, the metal gasket 3 has two balance beads 3f as convex portions, hollow side of which faces to lightning concavities 1c located each between two pairs of adjacent intake ports 1a on left and right side on joining surface 1 of the cylinder head and convex side of which wholly has a shape of approximately a hemisphere. The tips of those balance beads 3f abut lower portion of both ends of the gas passage concavity 2b in FIG. 4 on the joining surface 2 of the EGR plate.

Incidentally, parts of the forgoing full bead 3b across both ends of the gas passage concavity 2b on the joining surface 2 of the EGR plate abut only the joining surface 1 as shown in FIG. 5. Therefore, as to the side of the joining surface 2, the parts are facing to the gas passage concavity 2b, where they can not receive any pressuring force from the joining surface 2. Since the foregoing balance beads 3f, as shown in FIG. 4, is located near the parts of the full bead 3b across both ends of the gas passage concavity 2b, in addition the tips of the balance beads 3f abut the joining surface 2 as shown in FIG. 5. In addition, hollow side of the balance beads 3f faces to lightning concavities 1c. Thus, the full beads 3f are in a state that they can be pushed into the lightning concavities 1c.

Furthermore, the metal gasket 3 in the embodiment has conventional rubber coating layer (not shown in the drawing) composed of synthetic rubber and the like on both surfaces of the foregoing blank metal plate except whole area of the foregoing balance beads 3f having a shape of approximately a hemisphere, areas composing fluid passage opposite to the gas passage concavity 1b and extended area 1e on the joining surface 1 and areas composing fluid passage opposite to the gas passage concavity 2b on the joining surface 2.

In the metal gasket 3 in this embodiment constituted as mentioned above, after the metal gasket 3 is interposed between the joining surface 1 of the cylinder head and the joining surface 2 of the EGR plate, when two joining surface 1 and 2 are pushed in the closing direction each other as shown with arrow A in FIG. 5 by clamping force of five fitting bolts which are passed through the penetrating holes 2c and 3e for the bolts and screwed on bolt installing holes 1d each. Then, other parts of the full bead 3b except the parts across both ends of the gas passage concavity 2b on the joining surface 2 are clamped between the foregoing joining surfaces 1 and 2 and are pushed strongly to the joining surfaces 1, 2 to generate high surface pressure.

Furthermore, in the metal gasket 3 in this embodiment, since the balance beads 3f, the tips of which abut the joining surface 2 of the EGR plate, as the other joining surface, as shown in FIG. 5, is equipped near the each part of the full bead 3b across both ends of the gas passage concavity 2b on the joining surface of the EGR plate, which abut only the joining surface 1 of the cylinder head, as one joining surface. Therefore, surrounding areas of the balance bead 3f are pressed toward the joining surface 1 of the foregoing cylinder head by the abutting of the tip of balance beads 3f to the joining surface 2 of the EGR plate, then the parts of the full bead 3b across both ends of the gas passage concavity 2b, which are located near to the balance beads 3f of the metal gasket 3 and abut only the joining surface 1 of the cylinder head, are pressurized strongly to the joining surface 1 of the cylinder head. By this action, high surface pressure is generated also in the areas of the full bead 3b abutting only the joining surface 1 of the cylinder head.

Therefore, in the metal gasket 3 in this embodiment, even though the gas passage concavity 2b for EGR system is formed on areas opposing partially to the full bead 3b on the joining surface 2 of the EGR plate, which is one of the joining surface 1 of the cylinder head and the joining surface 2 of the EGR plate which are clamping the metal gasket 3 therebetween, at request for further engine exhaust gas cleaning and more improvement in fuel consumption, high sealing properties owing to the high surface pressure can be exerted on whole circumference of the full bead 3b including areas opposite to the gas passage concavity 2b though a single plate-type of metal gasket is employed. Thus, a highly airtight EGR gas passage which from the gas passage concavity 1b provided on the joining surface 1 of the cylinder head, via the gas passage through hole 3c, passes through the gas passage concavity 2b provided on the joining surface 1 of the cylinder head and from both ends of the gas passage concavity 2b, via the gas passage through holes 3d, reaches extended portion 1e of the foregoing each intake port 1a provided on the joining surface 1 on the cylinder head, is formed.

Moreover in the metal gasket 3 in this embodiment, since balance beads 3f as convex portions are provided on the area where they abut only the joining surface 2 of the EGR plate, that is, at the position of lightning concavity 1c where they do not abut the joining surface 1 of the cylinder head, the balance beads 3f, the tips of which abut the joining surface 2 of the EGR plate, is pushed toward the joining surface 1 of the cylinder head without being restrained by the joining surface 1. Then, parts of the full bead 3b located near the balance beads 3f are pressurized to the joining surface 1 of the cylinder head and higher surface pressure is generated and then higher sealing properties (pressure resistance) can be obtained.

Moreover, in the metal gasket 3 of the embodiment, since beads surrounding intake ports 3a and gas passage through holes 3d, are the full bead 3b, and also portions abutting only the joining surface 1 of the cylinder head is the tip of the full bead 3b, bead portions abutting only the joining surface 1 of the cylinder head, locating near the balance beads 3f in the metal gasket 3, become the tip of the full bead 3b. By the abutting of the tips of the balance beads 3f to the joining surface 2 of the EGR plate, the tip of the full bead 3 is pressurized strongly to the joining surface 1 of the cylinder head to generate higher surface pressure on areas abutting only the joining surface 1 as one of the joining surfaces, and higher sealing properties (pressure resistance) can be obtained.

Moreover, in the metal gasket 3 of the embodiment, since the whole of the balance beads 3f are formed in a hemispherical shape and a conventional rubber coating layer 3g composed of a synthetic rubber and the like is formed on both surfaces of the blank metal plate of the metal gasket 3 except the whole of the balance bead 3f and areas forming the foregoing fluid passages, even if there is a dispersion in flatness within tolerance, uniform pressure can be applied to the area of the full bead 3b abutting only the joining surface 1 of the cylinder head, due to the hemispherical shape of the balance beads 3f abutting the joining surface 2, moreover, the rubber coating layer 3g formed on both surfaces of the blank metal plate of the metal gasket 3 can be deformed elastically corresponding to marks made by tools and the like on the both joining surfaces and then higher sealing properties can be obtained. Furthermore, a rubber coating layer is formed on areas except whole of the balance beads 3f and areas forming fluid passages, in the balance beads 3f, wearing of the rubber coating layer 3g by fretting (sliding) on the joining surfaces 1 and 2 generated from repeated temperature variation of an engine can be avoided and at the same time transmission efficiency of pressuring force can be improved. On the other hand, in the areas forming fluid passages, separation of the rubber coating layer 3g by flowing of EGR gas as a fluid can be prevented.

Figure 6:
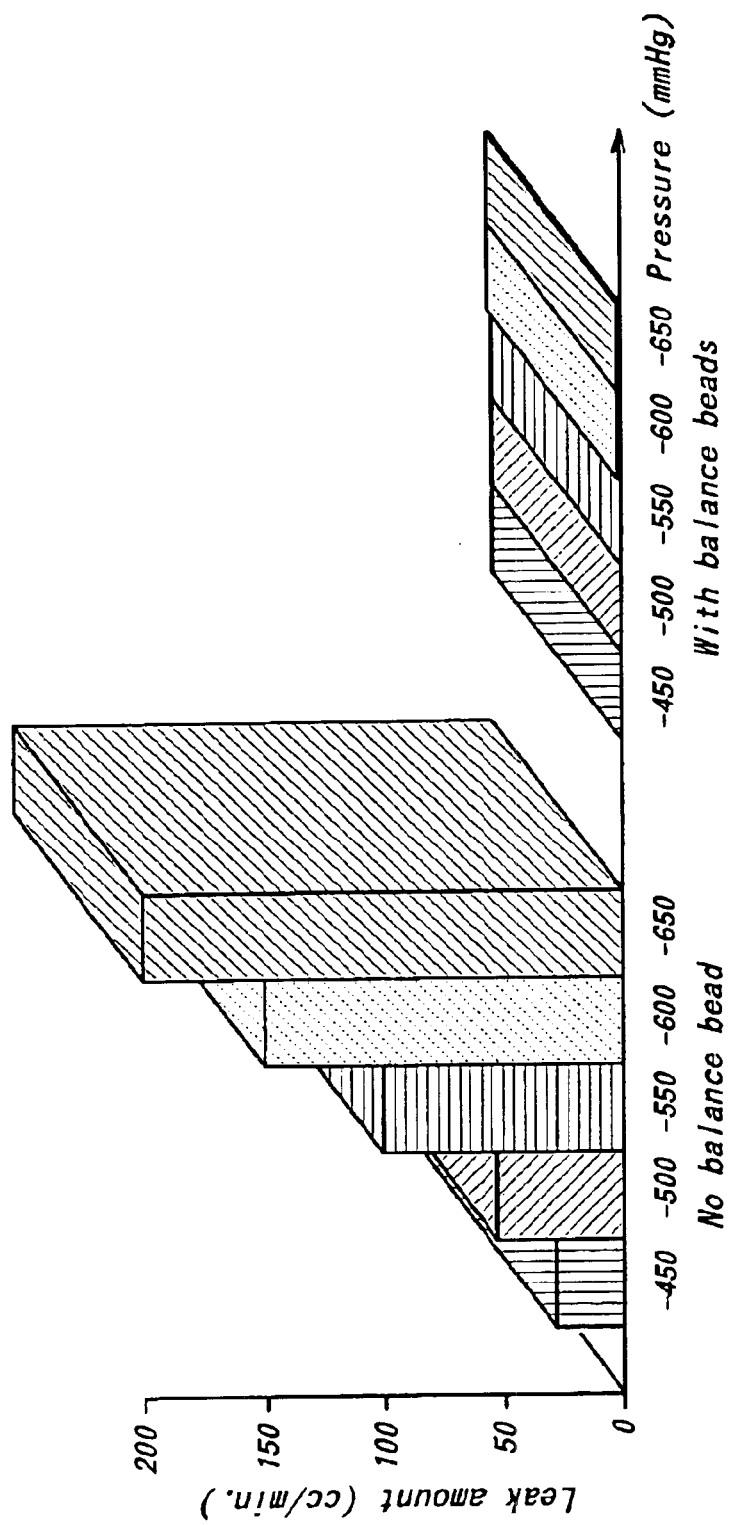
FIG. 6 is a graph showing test results comparing sealing properties under negative pressure in a metal gasket having balance beads of the foregoing embodiment and a metal gasket having no balance bead in the comparative example.
Figure 7:
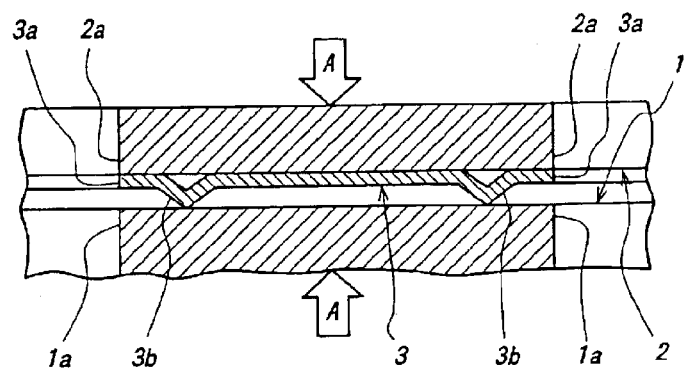
FIG. 7 is an explanatory view showing a state that a conventional metal gasket is held between two joining surfaces, which is not provided portions having no pressuring surface.
Figure 8:
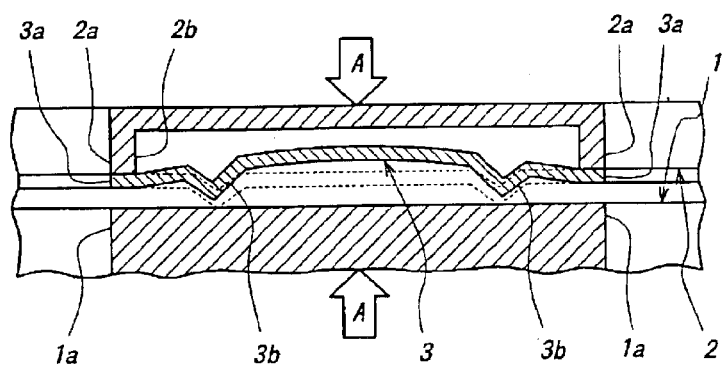
FIG. 8 is an explanatory view showing a state that a conventional metal gasket is held between two joining surfaces, one of which has portions having no pressuring surface.

Table 1 shown below shows test results comparing sealing properties under negative pressure in the metal gasket 3 of the foregoing embodiment having the balance beads 3f and the metal gasket having no balance bead, which is prepared by removing the balance beads 3 from the metal gasket 3, as a comparative example, and FIG. 6 is a graph showing the test results.

TABLE 1

| Pressure (mmHg) | No balance bead (cc/min) | With balance beads (cc/min) |
|---|---|---|
| −450 | 29.0 | 0 |
| −500 | 55.3 | 0 |
| −550 | 101.0 | 0 |
| −600 | 150.0 | 1.0 |
| −650 | 200.0 | 2.2 |

In the foregoing test results, leak amount at −450 mmHg of the comparative example with no balance bead was 29 cc/min which did not satisfy a predetermined requested performance. However, leak amount of the metal gasket 3 in the foregoing embodiment which has the balance beads 3f was only 2.2 cc/min even at −650 mmHg, which satisfied the predetermined requested ability sufficiently. Thus, it was confirmed that the metal gasket 3 in the foregoing embodiment has extremely high sealing properties.

As mentioned above, description was made for an embodiment with reference to the drawings, but the invention is not limited to the foregoing embodiment. For example, the foregoing bead is not limited to a full bead having a chevron shape, but may be a half bead having single slope. Moreover, the foregoing convex portion is not limited to one having almost hemispherical shape and may be one having almost cone shape or a full bead having chevron shape extending in projected line state or a half bead having single slope. In addition, the metal gasket according to the present invention may be used not only between joining surfaces of an engine but also between other joining surfaces and it is not limited to a single plate-type but may be used as a laminated type.

What is claimed is:

1. A sealing assembly includes a metal gasket which is clamped between joining surfaces and has at least one hole for fluid, said metal gasket comprising:
    a bead for sealing said joining surfaces, said bead surrounding said at least one hole, each of which allows openings for fluid to be communicated with each other, the openings being provided in the respective joining surfaces, and
    a convex portion, a tip of which abuts one of said joining surfaces, being provided in vicinity of a portion of said bead abutting only the other of said joining surfaces, said convex portion being spaced apart from said bead,
    wherein at least a tip portion of said convex portion is formed to be a hemispherical shape, and a rubber coating layer is provided on both surfaces of a blank metal piece of said metal gasket except at least an area of said tip portion of said convex portion and an area forming a fluid passage.

2. A metal gasket according to claim 1, wherein said convex portion is provided in a position in which said convex portion abuts only said one of said joining surfaces.

3. A metal gasket according to claim 1, wherein said bead is a full bead, and said portion of said bead directly abutting only one of said joining surfaces is a tip of said full bead.

4. A metal gasket according to claim 2, wherein said bead is a full bead, and said portion of said bead directly abutting only one of said joining surfaces is a tip of said full bead.

5. Sealing assembly includes a metal gasket which is clamped between joining surfaces and has at least one hole for fluid communication, said metal gasket comprising:
    a planar portion;
    a bead extending from said planar portion in a first direction, for sealing said planar joining surfaces, said bead surrounding said at least one hole; and
    a convex portion extending from said planar portion in a second direction opposite said first direction, part of said planar portion being between said bead and said convex portion, a tip of said convex portion abutting one of said joining surfaces, said bead abutting only another one of said joining surfaces,
    wherein at least said tip portion of said convex portion is hemispherical shaped, and a rubber coating layer is provided on both surfaces of a metal plate of said metal gasket except at least an area of said tip portion of said convex portion and an area forming a fluid passage.

6. The metal gasket according to claim 5, wherein said convex portion abuts only said one of said joining surfaces.

7. The metal gasket according to claim 6, wherein said bead is a full bead having a tip directly abutting said another one of said joining surfaces.

8. The metal gasket according to claim 5, wherein said bead is a full bead, having a tip directly abutting said another one of said joining surfaces.

9. The metal gasket as claimed in claim 5, further comprising at least one bolt through hole, said at least one bolt through hole being outside of said bead.

10. The metal gasket as claimed in claim 5, wherein said bead is generally V-shaped.

11. A sealing assembly includes a metal gasket which is clamped between joining surfaces and has at least one hole for fluid communication, said metal gasket comprising:

a main body portion;

a bead for sealing said joining surfaces, said bead extending from said main body portion and surrounding said at least one hole, said bead comprising, in plan view, at least first and second portions, each of said first and second portions forming two separate and distinct angles with said main body portion; and a convex portion connected to said main body portion and having a tip portion abutting one of said joining surfaces, said bead abutting only another one of said joining surfaces, wherein at least said tip portion of said convex portion is hemispherical shape, and a rubber coating layer is provided on both surfaces of a blank metal plate of said metal gasket except at least an area of said tip portion of said convex portion and an area forming a fluid passage.

12. The metal gasket according to claim 11, wherein said convex portion abuts only said one of said joining surfaces.

13. The metal gasket according to claim 12, wherein said bead is a full bead having a tip directly abutting said another one of said joining surfaces.

14. The metal gasket according to claim 11, wherein said bead is a full bead, having a tip directly abutting said another one of said joining surfaces.

* * * * *